(12) United States Patent
Berns

(10) Patent No.: US 10,300,611 B2
(45) Date of Patent: May 28, 2019

(54) END EFFECTOR ASSEMBLY AND METHOD OF OPERATION TO GRASP NON-PLANAR ARTICLES

(71) Applicant: MGS Machine Corp., Maple Grove, MN (US)

(72) Inventor: Eric J. Berns, Elk River, MN (US)

(73) Assignee: MGS Machine Corporation, Maple Grove, MN (US)

( * ) Notice: Subject to any disclaimer, the term of this patent is extended or adjusted under 35 U.S.C. 154(b) by 107 days.

(21) Appl. No.: 15/668,684

(22) Filed: Aug. 3, 2017

(65) Prior Publication Data

US 2018/0036892 A1  Feb. 8, 2018

Related U.S. Application Data

(60) Provisional application No. 62/371,585, filed on Aug. 5, 2016.

(51) Int. Cl.
*B66C 1/02* (2006.01)
*B25J 15/06* (2006.01)
*B25J 15/00* (2006.01)

(52) U.S. Cl.
CPC ....... *B25J 15/0616* (2013.01); *B25J 15/0061* (2013.01)

(58) Field of Classification Search
CPC .. B25J 15/0616; Y10S 901/40; B66C 1/0237; B66C 1/0243
USPC .............................. 294/188, 65, 183; 901/40
See application file for complete search history.

(56) References Cited

U.S. PATENT DOCUMENTS

| 4,905,456 A * | 3/1990 | Olaechea | B65B 5/105 294/65 |
|---|---|---|---|
| 5,079,903 A * | 1/1992 | Hakansson | B65B 35/38 294/65 |
| 5,609,377 A * | 3/1997 | Tanaka | B65G 47/918 294/65 |
| 8,684,418 B2 * | 4/2014 | Lin | B25J 15/0061 269/21 |
| 8,944,481 B2 * | 2/2015 | Collado Jimenez | B25J 15/0061 294/185 |
| 10,118,300 B2 * | 11/2018 | Wagner | B25J 15/0683 |
| 2011/0291433 A1 * | 12/2011 | Feng | B25J 9/0051 294/65 |

(Continued)

FOREIGN PATENT DOCUMENTS

WO  WO-2014111633 A1 *  7/2014  .......... B25J 15/0052

*Primary Examiner* — Gabriela M Puig
(74) *Attorney, Agent, or Firm* — Skaar Ulbrich Macari, P.A.

(57) ABSTRACT

An end effector is configured to grasp articles that have deviated from their original shape. The end effector can return the article to its expected condition. The end effector can include a main platform, a first sub-platform and a second sub-platform. A first suction cup extends vertically below the main platform. Each of the sub-platforms includes one or more suction cups, respectively, that protrude vertically below the sub-platforms. Each sub-platform is connected to the main platform via a bellows actuator that can be extended and retracted via positive and negative pressures. The main platform can include fittings to allow the end effector to be attached to a wide variety of robotic arms, such as a delta robot.

20 Claims, 4 Drawing Sheets

(56) References Cited

U.S. PATENT DOCUMENTS

2014/0037413 A1\* 2/2014 Takashima ........... B25J 15/0675
    414/680
2016/0009325 A1\* 1/2016 Perkins .................. B62D 65/18
    212/171

\* cited by examiner

END EFFECTOR ASSEMBLY AND METHOD OF OPERATION TO GRASP NON-PLANAR ARTICLES

PRIORITY

This application claims the priority benefit of U.S. Provisional Application No. 62/371,585, filed on Aug. 5, 2016, which is hereby incorporated herein by reference in its entirety.

FIELD

The present invention relates generally to end effectors, and more particularly, to pneumatically-driven end effector assemblies for picking up planar and non-planar articles.

BACKGROUND

End effectors are tools attached to robotic arms used to pick up articles, for example, sheets of paper or cardboard. The articles are delivered to the robot, which then has to grasp or pick up the article and move it in a pre-determined fashion for further processing. The robotic arm places the end effector in the desired location and orientation with respect to the article so that the article can be grasped via a plurality of suction cups protruding from the end effector. The cups contact the article and negative pressure is applied through the cups, thereby causing the end effector to grab the article. The robot arm can then move the article as desired.

Typically the end effector is attached to the robotic arm. The arrangement of the suction cups of the effector is usually specific to the shape or contour of the article that is desired to be grasped. For example, a planar article would have all of the suction cups arranged such that the distal end of the cups all lie in the same plane. That way, the grasping forces for each cup can be distributed equally and the article successfully grasped.

However, difficulties can arise when an end effector is configured to pick up a generally flat or planar article, but some of the flat articles presented to the end effector deviate from the expected planarity or flatness. This may result in some of the articles not being grasped correctly, if at all. Thus, there is a need to provide improved end effectors, and methods of operating the same, to address the above-noted situations where articles to be picked up deviate from the expected shape.

SUMMARY

The disclosure addresses the problems discussed above by providing an end effector that is configured to grasp articles that have deviated from their original shape. The end effector can return the article to its expected condition.

The end effector in certain embodiments can include a main platform, a first sub-platform and a second sub-platform. A first suction cup extends vertically below the main platform. Each of the sub-platforms includes one or more suction cups, respectively, that protrude vertically below the sub-platforms. Each sub-platform is connected to the main platform via a bellows actuator that can be extended and retracted via positive and negative pressures. The main platform can include fittings to allow the end effector to be attached to a wide variety of robotic arms, such as a delta robot.

The disclosure includes an end effector assembly, comprising a main platform, a first sub-platform attached to the main platform via a first bellows actuator, a first suction cup provided to the main platform and extending vertically below the main platform, and a second suction cup provided to the first sub-platform and extending vertically below the first sub-platform. The first sub-platform is pneumatically extendable and retractable in a vertical direction via the first bellows actuator. The first sub-platform is movable in a horizontal direction.

Each of the first and second suction cups can include a flexible rubber gasket disposed at a vertically lowermost end thereof.

A second sub-platform can be attached to the main platform via a second bellows actuator. The second sub-platform is pneumatically extendable and retractable in a vertical direction via the second bellows actuator. The second sub-platform is movable in a horizontal direction. A third suction cup is provided to the second sub-platform and extends vertically below the second sub-platform. Each of the first and second sub-platforms can be located adjacent a respective opposing first and second side of the main platform.

Additional suction cups can be provided to each of the main platform, the first sub-platform and the second sub-platform. More then two sub-platforms can also be provided.

The disclosure also includes a method of grasping an object that has deviated from a flat condition and returning the object to the flat condition. The method in certain embodiments includes engaging a first suction cup of a main platform with a top surface of the object, securing the object to the first suction cup by creating a vacuum through the first suction cup, applying positive pressure to a first bellows actuator that connects the main platform to a first sub-platform, thereby extending the first sub-platform in a direction away from the main platform, engaging a second suction cup of the first sub-platform with the top surface of the object subsequent to the application of positive pressure to the first bellows actuator and subsequent to securing the object to the first suction cup, securing the object to the second suction cup by creating a vacuum through the second suction cup, and retracting the first bellows actuator via a vacuum condition created within the first bellows actuator, thereby returning the object to the flat condition.

The application of positive pressure can extend the first sub-platform vertically downward towards the object.

The step of engaging a second suction cup of the first sub-platform with the top surface of the object can include the first sub-platform moving in a horizontal direction.

The step of engaging a first suction cup of a main platform with a top surface of the object can include contacting the top surface of the object with a flexible rubber gasket disposed on a distal end of the first suction cup.

The step of engaging a second suction cup of the first sub-platform with the top surface of the object can include contacting the top surface of the object with a flexible rubber gasket disposed on a distal end of the second suction cup.

The object can be rotated subsequent to the retracting of the first bellows actuator.

The main platform can be secured to a robotic arm or to a delta robot.

The method can also include applying positive pressure to a second bellows actuator that connects the main platform to a second sub-platform, thereby extending the second sub-platform in a direction away from the main platform, engaging a third suction cup of the second sub-platform with the top surface of the object subsequent to the application of positive pressure to the second bellows actuator and subsequent to securing the object to the first suction cup, securing the object to the third suction cup by creating a vacuum through the third suction cup, and retracting the second bellows actuator via a vacuum condition created within the second bellows actuator, thereby returning the object to the flat condition.

The disclosure further includes a system for grasping non-flat objects and returning the objects to a flat condition. The system can include a main platform, a first sub-platform attached to the main platform via a first bellows actuator, a first suction cup provided to the main platform and extending vertically below the main platform, and a second suction cup provided to the first sub-platform and extending vertically below the first sub-platform such that a distal end of the second suction cup is co-planar with a distal end of the first suction cup when the first bellows actuator is in a retracted state. The first bellows actuator can be configured to extend under positive pressure and retract under negative pressure, the first sub-platform configured to float in a horizontal direction when the first bellows actuator is not fully retracted.

Each of the first and second suction cups can include a flexible rubber gasket defining a vertically lowermost end thereof.

A second sub-platform can be attached to the main platform via a second bellows actuator. The second bellows actuator can be configured to extend under positive pressure and retract under negative pressure, the second sub-platform configured to float in a horizontal direction when the second bellows actuator is not fully retracted. A third suction cup provided to the second sub-platform and extending vertically below the second sub-platform such that a distal end of the third suction cup is co-planar with the distal end of the first suction cup when the second bellows actuator is in a retracted state.

Each of the first and second bellows actuators can be secured adjacent a respective opposing first and second side of the main platform.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
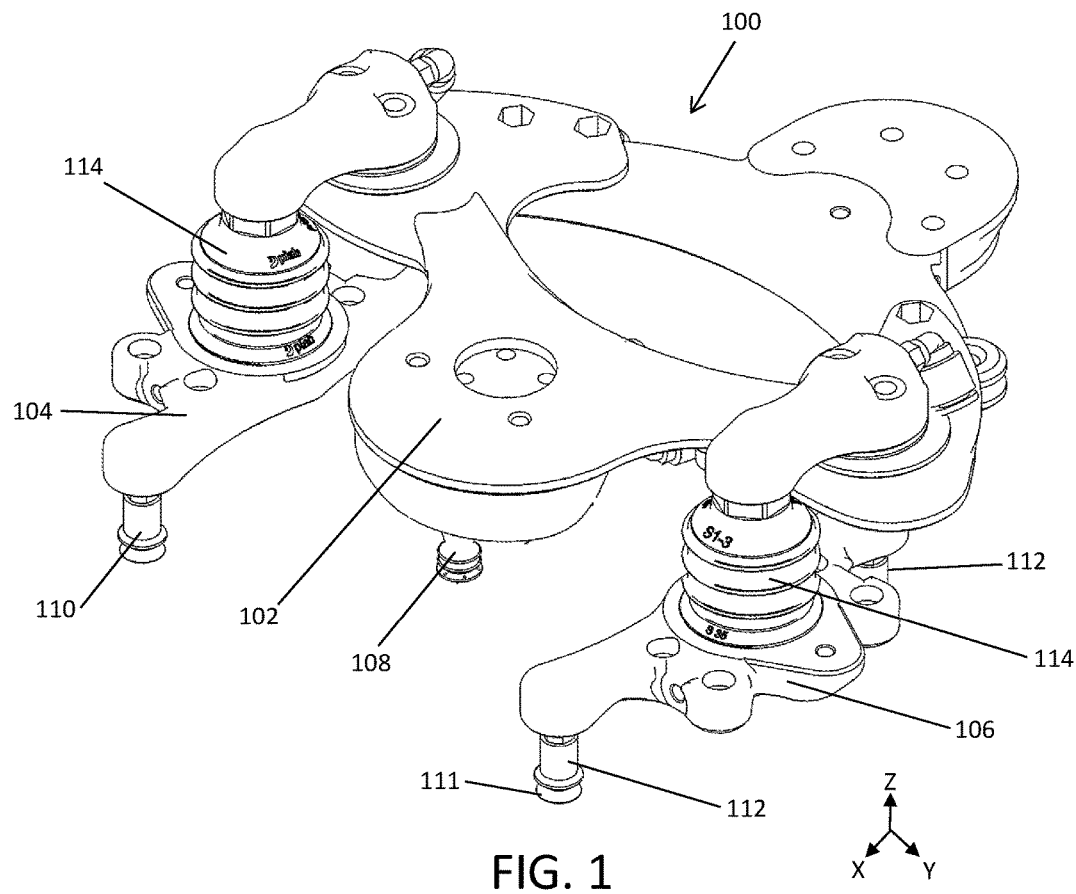
FIG. 1 is a perspective view of an end effector according to certain embodiments.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention. It is understood that the various features and aspects discussed herein may be used in any combination, or in isolation, without departing from the scope of the present invention.

An x-y-z Cartesian coordinate system is used for descriptions throughout this disclosure. However, it should be understood that the designation of the specific coordinate system axes can be re-ordered without departing from the scope of the invention. The coordinates are provided for the ease and clarity of understanding the structure, function and operation of the invention in various embodiments. The specific coordinates are not limiting of the scope of the invention.

Figure 2:
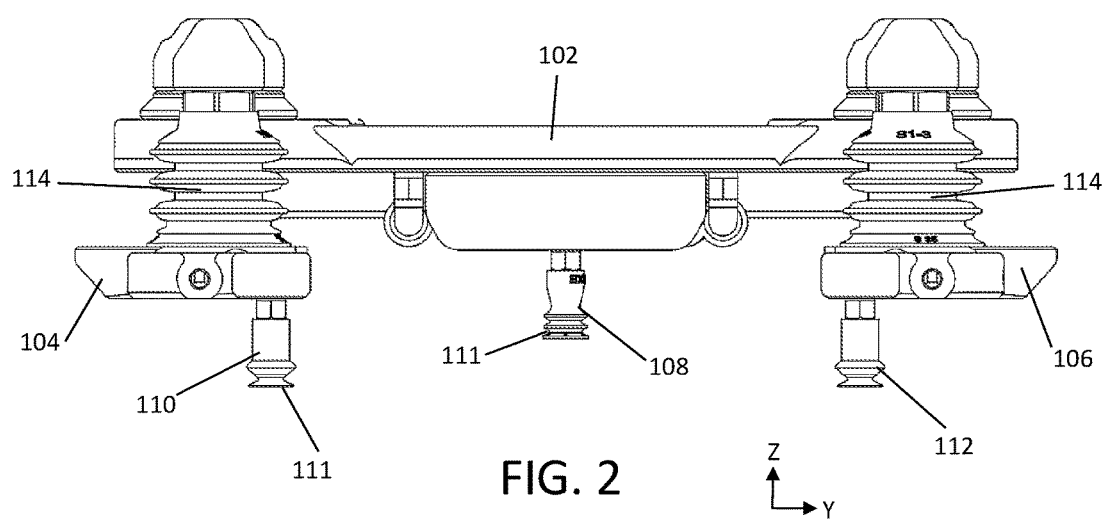
FIG. 2 is a side view of an end effector according to certain embodiments.

Referring to FIGS. 1-2, an end effector assembly 100 is shown. The assembly generally comprises a main platform 102, a first sub-platform 104 and a second sub-platform 106. A first suction cup 108 extends vertically (z-axis) below the main platform. Each of the sub-platforms 104, 106 receives a pair of suction cups 110, 112, respectively, that protrude vertically below their sub-platforms 104, 106.

The first suction cup 108 can also be provided as a pair of suction cups, or as more than two suction cups. The suction cup 110, 112 on the sub-platforms 104, 106 can also number one, two, three or more.

The main platform 102 can include fittings to allow the end effector assembly 100 to be attached to a wide variety of robotic arms. For example, the assembly 100 can be secured to a delta robot. The means for securing the main platform include any conventional means such as bolts and other fasteners.

Each of the individual suction cups 108, 110 and 112 is connected to a pneumatic (vacuum) system to provide negative air pressure to the suction cups 108, 110, 112. The distal ends of each of the suction cups comprises a flexible rubber gasket 111 that defines a distal aperture in order to create an air seal against a surface of the article to be grasped.

Each sub-platform 104, 106 is suspended from the main platform 102 via a bellows-type actuator 114. The bellows actuators 114 each extend vertically downward below the main platform 102 and can contract vertically upward along the z-axis. The pneumatic system applied to the bellows 114 controls the z-axis extension and contraction movements.

Figure 6:
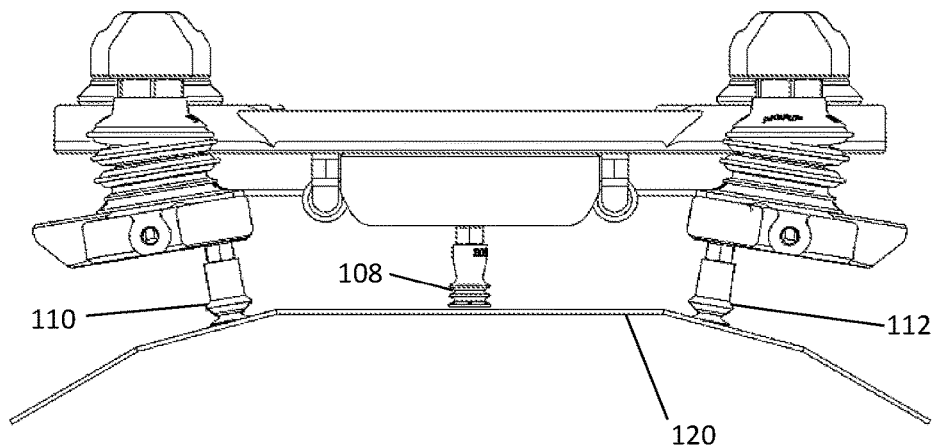
FIG. 6 is a side view of an end effector engaging an article according to certain embodiments.

The bellows actuators 114 are also flexible so as to allow movement of the sub-platforms 104, 106 along the x-axis and y-axis in addition to the z-axis. The movement can include pivoting about the upper or proximal end of the bellows actuator 114 (e.g., as shown in FIG. 6). The plural degrees of freedom of the bellows actuators 114 allow the suction cups 110, 112 to effectively float atop the article prior to the grasping. The floating feature allows the suction cups 110, 112 to achieve an orientation optimized to achieve a successful seal against the upper surface of the article that is to be grasped. For example, it can be seen in FIG. 6, that the long axis of the suction cups 110 and 112 are each oriented approximately perpendicular to the surface of the article where the respective suction cup will grasp. This means that the plane across the end of the suction cup is approximately parallel to the surface of the article where the respective suction cup will grasp.

The end effector assembly 100 configuration described above allows grasping of a wide variety of article configurations. For example, many types of items are sealed in film packages. Such film packages generally resemble a horizontal or flat plane. However, the package often times deviates from being purely horizontal due to temperature variations, transport, packaging anomalies and other reasons. This results in a stack of the articles to be grasped where the individual articles are no longer in a planar or flat condition.

The use of the end effector assembly will now be discussed with respect to FIGS. 3-8 in the course of grasping the article 120. Note that the example article 120 is shown to have a slight curvature such that it is not perfectly flat or planar.

Figure 3:
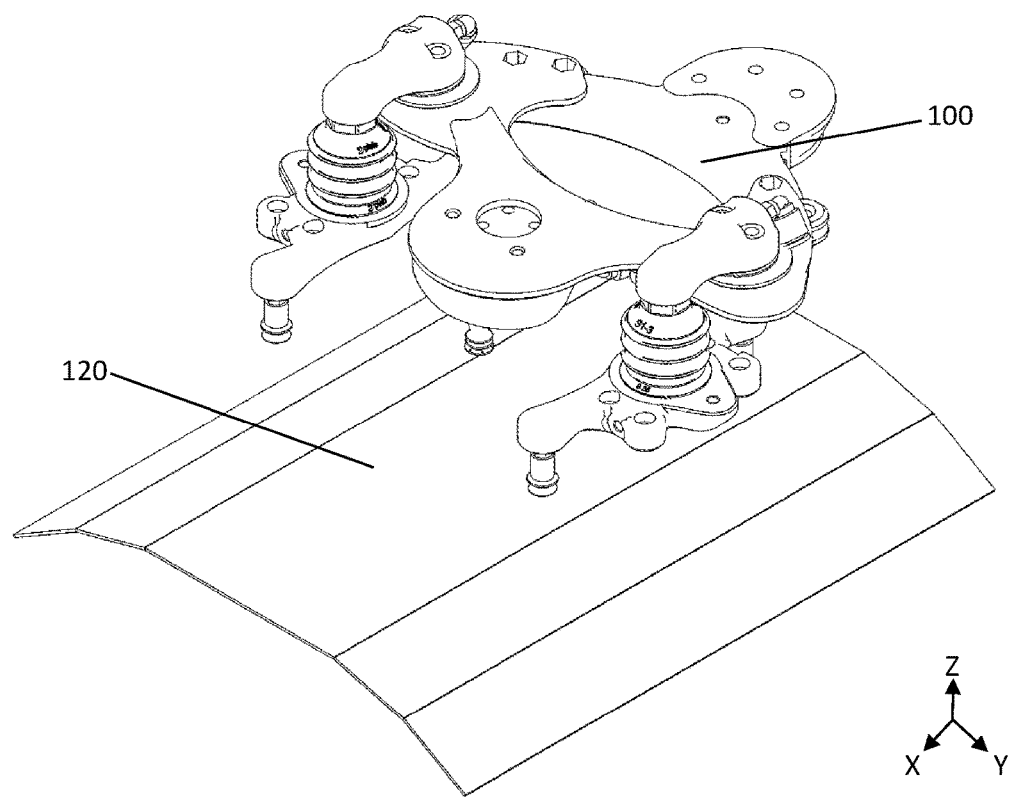
FIG. 3 is a perspective view of an end effector adjacent to an article according to certain embodiments.
Figure 4:
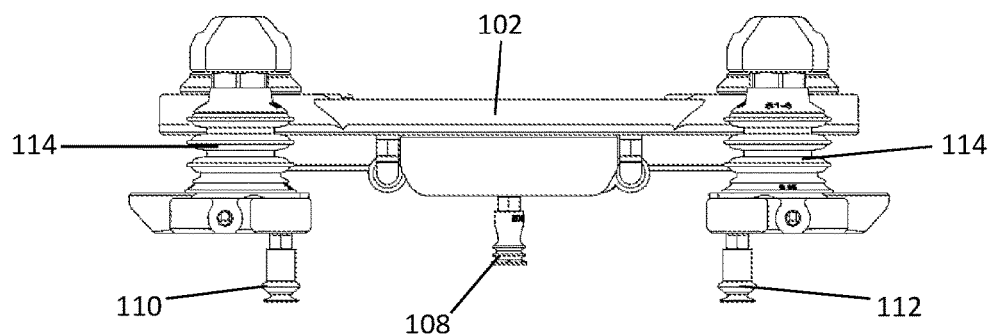
FIG. 4 is a side view of an end effector adjacent to an article according to certain embodiments.

Referring to FIGS. 3-4, the end effector assembly 100 has been moved by the robot arm (arm not shown) directly above article 120. The end effector assembly 100 is also rotated by the robot in the x-y plane to the desired rotational alignment with respect to the article 120.

Figure 5:
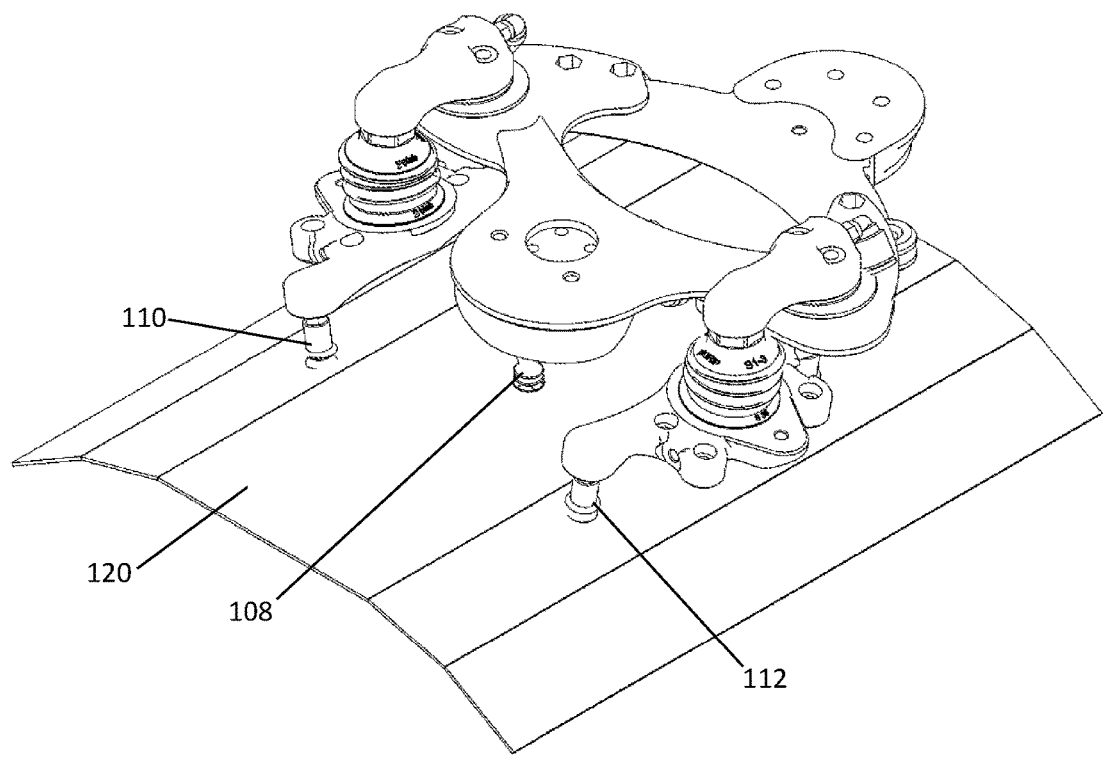
FIG. 5 is a perspective view of an end effector engaging an article according to certain embodiments.

In FIGS. 5-6, the end effector assembly 100 has moved downward in the vertical or z-axis until each of the individual suction cups 108, 110 and 112 contacts the upper surface of the article 120. The contact can be aided by briefly introducing a positive pressure into the bellows actuators 114 and/or the suction cups 110, 112 attached to the sub-platforms 104, 106. The positive pressure momentarily forces the distal ends of the suction cups/bellows vertically downwards in the z-axis until the distal ends of the suction cups 110, 112 make contact with the top surface of the article 120. The bellows actuators 114 pivot or move to allow the suction cups 110, 112 to contact the upper surface of the article 120 at as close to a right angle as possible.

Once contact with the article 120 is made by all of the suction cups 108, 110, 112, the article 120 can be successfully grasped by causing a negative pressure or vacuum at the distal ends of the suction cups. The grasped article 120 can then be lifted by the robot arm off of a stack of the articles, or off a conveyor, etc., and then moved to a desired location.

The first suction cup(s) 108 extending below the main platform 102 contacts the article 120 first and engages the article to hold the article in place while the suction cups 110, 112 of the sub-platforms 104, 106 orient into position to also grab the article 120.

The use of two or more first suction cups 108 when performing a grasping operation prevents the article 120 from twisting during the subsequent grasping steps.

Figure 7:
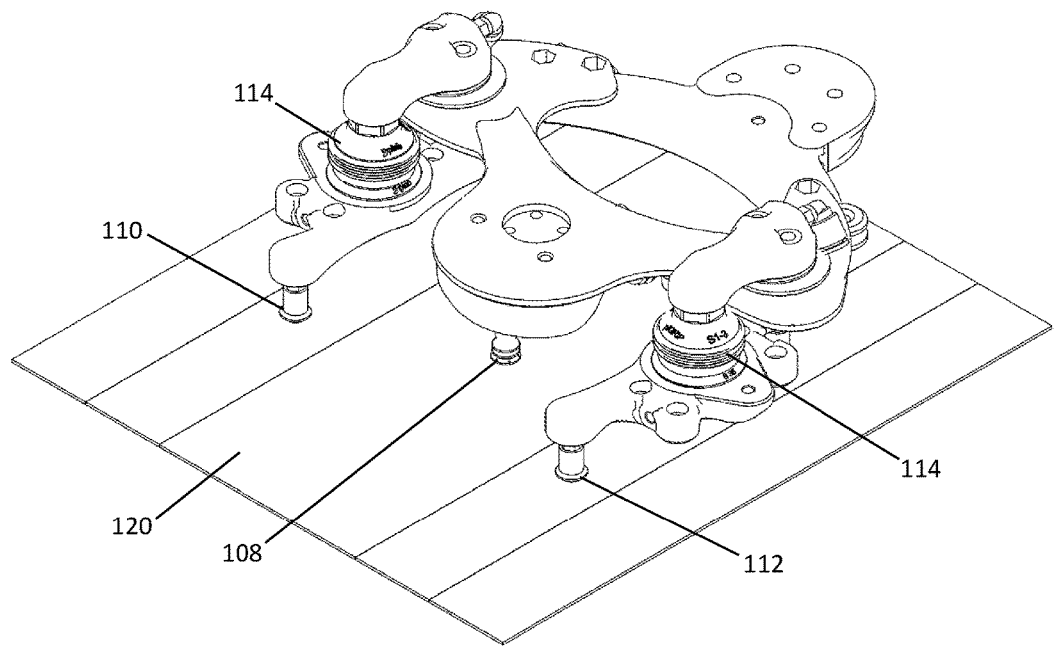
FIG. 7 is a perspective view of an end effector grasping and straightening an article according to certain embodiments.
Figure 8:
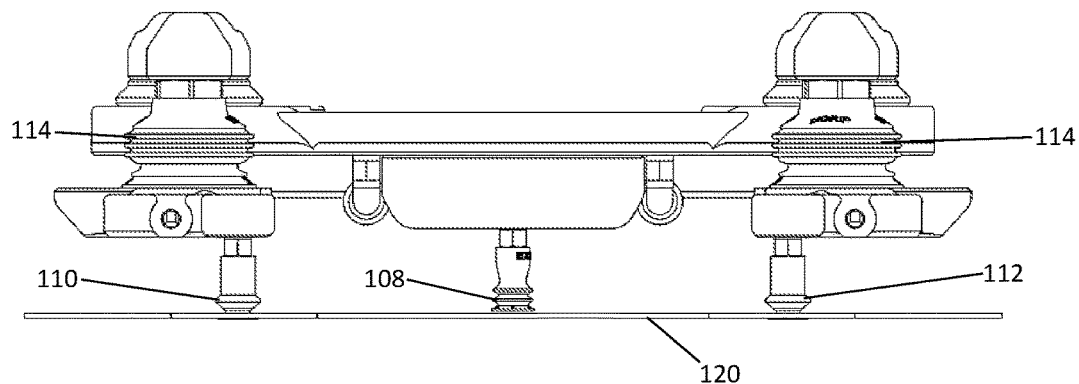
FIG. 8 is a side view of an end effector grasping and straightening an article according to certain embodiments.

FIGS. 7-8 show the article 120 being flattened by retraction of the bellows actuators 114. This step advantageously returns the article 120 to its original flat planar shape so that it can be better processed downstream. The bellows actuators 114 provide sufficient travel range to move the distal ends of each of the individual suction cups 110, 112 of the sub-platforms 104, 106 to be all aligned in the same plane as the distal ends of the first suction cups 108.

The robot arm can be used to rotate the article 120 once grasped, but before the article is set down or stacked. Thus, the system can be used to orient the article as desired.

After the grasping and straightening steps are completed, the article 120 is moved to a desired location for further processing, such as cutting, packing, palletizing, etc.

The rigid components such as the main platform 102 and the sub-platforms 104, 106 can be formed of metal, rigid plastics or other suitable materials. The flexible components such as the bellows actuators 114 and the distal end portions of the suction cups 108, 110, 112 can be formed of flexible rubber, plastics and other suitable materials.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An end effector assembly, comprising:
a main platform;
a first sub-platform attached to the main platform via a first bellows actuator;
a first suction cup provided to the main platform and extending vertically below the main platform;
a second suction cup provided to the first sub-platform and extending vertically below the first sub-platform;
wherein the first sub-platform is pneumatically extendable and retractable in a vertical direction via the first bellows actuator, and
wherein the first sub-platform is movable in a horizontal direction.

2. The end effector assembly of claim 1, wherein the main platform is configured to be secured to a robot arm.

3. The end effector assembly of claim 1, wherein each of the first and second suction cups includes a flexible rubber gasket disposed at a vertically lowermost end thereof.

4. The end effector assembly of claim 1, further comprising a second sub-platform, the second sub-platform attached to the main platform via a second bellows actuator, wherein the second sub-platform is pneumatically extendable and retractable in a vertical direction via the second bellows actuator, wherein the second sub-platform is movable in a horizontal direction, and wherein a third suction cup is provided to the second sub-platform and extends vertically below the second sub-platform.

5. The end-effector assembly of claim 4, wherein each of the first and second sub-platforms are located adjacent a respective opposing first and second side of the main platform.

6. The end-effector assembly of claim 1, further comprising a third suction cup provided to the first sub-platform and extending vertically below the first sub-platform.

7. A method of grasping an object that has deviated from a flat condition and returning the object to the flat condition, the method comprising:

engaging a first suction cup of a main platform with a top surface of the object;

securing the object to the first suction cup by creating a vacuum through the first suction cup;

applying positive pressure to a first bellows actuator that connects the main platform to a first sub-platform, thereby extending the first sub-platform in a direction away from the main platform;

engaging a second suction cup of the first sub-platform with the top surface of the object subsequent to the application of positive pressure to the first bellows actuator and subsequent to securing the object to the first suction cup;

securing the object to the second suction cup by creating a vacuum through the second suction cup; and retracting the first bellows actuator via a vacuum condition created within the first bellows actuator, thereby returning the object to the flat condition.

8. The method of claim 7, wherein the application of positive pressure extends the first sub-platform vertically downward towards the object.

9. The method of claim 8, wherein the step of engaging a second suction cup of the first sub-platform with the top surface of the object includes the first sub-platform moving in a horizontal direction.

10. The method of claim 7, wherein the step of engaging a second suction cup of the first sub-platform with the top surface of the object includes the first sub-platform moving in a horizontal direction.

11. The method of claim 7, wherein the step of engaging a first suction cup of a main platform with a top surface of the object includes contacting the top surface of the object with a flexible rubber gasket disposed on a distal end of the first suction cup.

12. The method of claim 7, wherein the step of engaging a second suction cup of the first sub-platform with the top surface of the object includes contacting the top surface of the object with a flexible rubber gasket disposed on a distal end of the second suction cup.

13. The method of claim 7, further comprising rotating the object subsequent to the retracting of the first bellows actuator.

14. The method of claim 7, further comprising securing the main platform to a robotic arm.

15. The method of claim 7, further comprising securing the main platform to a delta robot.

16. The method of claim 7, further comprising:

applying positive pressure to a second bellows actuator that connects the main platform to a second sub-platform, thereby extending the second sub-platform in a direction away from the main platform;

engaging a third suction cup of the second sub-platform with the top surface of the object subsequent to the application of positive pressure to the second bellows actuator and subsequent to securing the object to the first suction cup;

securing the object to the third suction cup by creating a vacuum through the third suction cup; and retracting the second bellows actuator via a vacuum condition created within the second bellows actuator, thereby returning the object to the flat condition.

17. A system for grasping non-flat objects and returning the objects to a flat condition, the system comprising:

a main platform;

a first sub-platform attached to the main platform via a first bellows actuator, wherein the first bellows actuator is configured to extend under positive pressure and retract under negative pressure, the first sub-platform configured to float in a horizontal direction when the first bellows actuator is not fully retracted;

a first suction cup provided to the main platform and extending vertically below the main platform; and a second suction cup provided to the first sub-platform and extending vertically below the first sub-platform such that a distal end of the second suction cup is co-planar with a distal end of the first suction cup when the first bellows actuator is in a retracted state.

18. The system of claim 17, wherein each of the first and second suction cups includes a flexible rubber gasket defining a vertically lowermost end thereof.

19. The system of claim 17, further comprising:

a second sub-platform attached to the main platform via a second bellows actuator, wherein the second bellows actuator is configured to extend under positive pressure and retract under negative pressure, the second sub-platform configured to float in a horizontal direction when the second bellows actuator is not fully retracted; and a third suction cup provided to the second sub-platform and extending vertically below the second sub-platform such that a distal end of the third suction cup is co-planar with the distal end of the first suction cup when the second bellows actuator is in a retracted state.

20. The system of claim 19, wherein each of the first and second bellows actuators are secured adjacent a respective opposing first and second side of the main platform.

* * * * *